US006911011B2

(12) United States Patent
Haag

(10) Patent No.: US 6,911,011 B2
(45) Date of Patent: Jun. 28, 2005

(54) DIGIT THERAPY DEVICE

(76) Inventor: Jody R. Haag, 141 W. 39th St., Reading, PA (US) 19606

( * ) Notice: Subject to any disclaimer, the term of this patent is extended or adjusted under 35 U.S.C. 154(b) by 264 days.

(21) Appl. No.: 10/308,995

(22) Filed: Dec. 4, 2002

(65) Prior Publication Data

US 2004/0111046 A1 Jun. 10, 2004

(51) Int. Cl.$^{7}$ .......................... A61H 7/00; G09B 15/06

(52) U.S. Cl. .......................... 601/40; 601/46; 601/136; 84/465

(58) Field of Search .............................. 601/23, 33, 40, 601/46, 136; 482/44, 47, 48, 49; 84/465, 467, 293; 434/300, 301–303, 402, 426

(56) References Cited

U.S. PATENT DOCUMENTS

| | | | | | |
|---|---|---|---|---|---|
| 86,722 | A | | 2/1869 | Armengol | |
| 251,206 | A | | 12/1881 | Forbush | |
| 638,632 | A | | 12/1899 | Griffin | |
| 806,681 | A | | 12/1905 | Kursheedt | |
| 1,204,437 | A | | 11/1916 | Heinze | |
| 2,202,202 | A | | 5/1940 | Hesse | |
| 3,227,446 | A | | 1/1966 | Minasola | |
| 3,871,646 | A | * | 3/1975 | Slack | 482/48 |
| 4,065,995 | A | * | 1/1978 | Greer | 84/465 |
| 4,105,200 | A | | 8/1978 | Unger | |
| 4,364,298 | A | * | 12/1982 | Piazza | 84/465 |
| 4,505,178 | A | * | 3/1985 | Redman | 84/465 |
| 4,822,027 | A | | 4/1989 | Kascak | |
| 5,738,613 | A | | 4/1998 | Clayton | |
| 5,756,914 | A | | 5/1998 | Streibl | |
| 5,952,595 | A | * | 9/1999 | Carnell | 84/465 |
| D416,299 | S | | 11/1999 | Hug | |
| 6,036,621 | A | | 3/2000 | Hancock | |
| 6,127,615 | A | * | 10/2000 | Rosenberg | 84/465 |
| 6,179,750 | B1 | | 1/2001 | Lonergan | |
| 6,315,698 | B1 | | 11/2001 | Barber | |
| 6,443,874 | B1 | | 9/2002 | Bennett | |
| 6,613,969 | B1 | * | 9/2003 | Petillo et al. | 84/314 R |
| 2003/0131710 | A1 | * | 7/2003 | Goldiner | 84/265 |
| 2003/0196538 | A1 | * | 10/2003 | Katchanov et al. | 84/297 S |

FOREIGN PATENT DOCUMENTS

| | | |
|---|---|---|
| GB | 2221847 A | 2/1990 |
| WO | WO 90/07957 | 7/1990 |

* cited by examiner

*Primary Examiner*—Gregory L. Huson
*Assistant Examiner*—Quang D. Thanh
(74) *Attorney, Agent, or Firm*—Richard C. Litman

(57) ABSTRACT

A digit therapy device and method for progressively desensitizing a patient's sensitive digit tip such as a sensitive tip of a finger, thumb, toe or big toe. In one embodiment of the invention, the device comprises at least one elongated flexible member and an optional torsion adjuster for varying the torsion of the at least one elongated flexible member. In another embodiment, the device comprises at least one ridge and/or at least one strip adapted for progressively desensitizing a sensitive digit tip. In a further embodiment, a novel method is provided for desensitizing a sensitive digit tip comprising, for example, the step of repeatedly running a sensitive digit tip across at least one elongated flexible member, ridge or strip adapted to facilitate the desensitization of the sensitive digit tip.

12 Claims, 10 Drawing Sheets

DIGIT THERAPY DEVICE

BACKGROUND OF THE INVENTION

1. Field of the Invention

The present invention relates to a therapeutic device and method to facilitate progressive desensitization of a sensitive digit tip such as a sensitive tip of a partially amputated finger, thumb, toe or big toe.

2. Description of the Related Art

There are numerous ways a person can injure a digit and produce a hypersensitive or otherwise sensitive digit tip such as a sensitive tip of a finger, thumb, toe or big toe. A sensitive digit tip can arise from a partially amputated, flayed or otherwise injured digit such as a partially amputated finger, thumb, or toe (including a big toe), wherein the injured digit has a sensitive tip.

For example, an accident with a metal hammer or moving part of a heavy machine can sever a finger at a point along the digit to produce a partially amputated digit with a sensitive digit tip. The tip of a digit may be flayed on rough contact with an abrasive surface such as a road surface. A part of a finger, thumb or toe may be spliced off by a blade, lifting machinery, or a hydraulic press stamping out or shaping e.g., vehicle parts. A driver of a vehicle may end up with a sensitive digit tip such as a partially spliced or flayed toe as a result of a vehicle accident. Thus, there are numerous ways a person can loose part of a digit to produce a sensitive digit tip.

Severing or flaying a finger, thumb, or toe often results in nerve damage which can result in a sensitive (including hypersensitive) digit tip. A patient with a sensitive digit tip is typically advised to follow a desensitization regime to alleviate or desensitize the sensitive digit tip. For example, a finger tip may be desensitized over time by gently tapping the finger tip or stump on a solid surface such as a table top. However, such tapping can cause considerable discomfort to a patient to the extent that the patient may prematurely curtail the desensitization regime.

A patient with a sensitive digit tip can suffer loss of earnings, particularly if the patient requires full use of their digits. Even where a patient does not need to have full use of their digits, a patient can still suffer from a lack of confidence in using their full complement of digits. For example, a patient with family responsibilities such as small children will find it hard to maintain a normal life style without constant fear of inadvertently touching a sensitive digit tip. Regaining confidence is clearly desirably in the use of, for example, a finger with a hypersensitive tip. Thus, there exists a need for a digit therapy device and method to desensitize a sensitive digit tip.

A wide range of therapeutic equipment is available from several well known manufacturers, which are widely used in a clinical setting by physiotherapists, including hand therapists. However, there is a lack of devices for desensitizing a sensitive digit tip. More particularly, there is a serious lack of appropriate devices than can be used by a patient in a home or office setting. Thus, there is a need for a device that can be used in a non-clinical setting to desensitize a sensitive digit tip.

In addition, equipment devoted to hand and finger therapy is often expensive, complicated and cumbersome to use. Thus, there is a need for a digit therapy device and method that is easy to use, can be used on a common household table top or carried on a train or used in an office setting, and is effective in desensitizing a sensitive digit tip.

Several efforts have been made to address these problems. U.S. Pat. No. 86,722 issued Feb. 9, 1869 to A. C. Armengol describes a key board for exercising fingers. The '722 device is designed to help a key board learner to acquire skills in fingering the keys of a key board. The '722 device is not designed to help a patient with an injured hand comprising a sensitive finger tip.

U.S. Pat. No. 5,756,914 issued May 26, 1998 to M. Streibl, describes a finger exerciser device to train and strengthen the finger mechanics of a musician. However, the '914 presupposes that the user is healthy and has at least reasonable use of their fingers, hand, arm, and wrist. The '914 device is not suitable for desensitizing an injured finger tip such as the tip of a recently partly amputated finger.

U.S. Pat. No. 2,202,202 issued Dec. 28, 1937, to G. Hesse, describes a device for exercising the fingers in the movements required for playing musical instruments such as a piano, violin, violoncello, guitar and the like. The '202 device fails to address the special issues associated with a patient with a sensitive finger tip.

British Patent Application No. GB 2221847A (2 221 847 A) published, Feb. 21, 1990 to P. McCann, describes an exercise device for assisting the player of a stringed instrument in developing his fingering skills. The '847 device comprises a manually graspable rigid base and a length of resilient wire. The '847 device also presupposes that the user is healthy and has at least reasonable use of their fingers. The '847 device is not suitable for desensitizing a sensitive finger tip.

Other patents showing devices for hand related devices but which do not solve the above mentioned problems include U.S. Pat. No. Des. 416, 299 issued Nov. 9, 1999 to P. M. P. Hug (a finger exerciser); U.S. Pat. No. 251,206 issued Dec. 20, 1881 to H. Forbush (device for training muscles used in writing); U.S. Pat. No. 638,632 issued Dec. 5, 1899 to V. M. Griffin (musician's finger strengthener); U.S. Pat. No. 806,681 issued Dec. 5, 1905 to E. B. Kursheedt (finger exercising device for improving, e.g. lateral reach for playing instruments); U.S. Pat. No. 1,204,437 issued Nov. 14, 1916 to V. Heinze (means for correcting the human hand for musical purposes); U.S. Pat. No. 3,227,446 issued Jan. 4, 1966 to J. A. Minasola (finger, hand and wrist developer); U.S. Pat. No. 4,105,200 issued Aug. 8, 1978 to A. Unger (hand and finger exercise device); U.S. Pat. No. 4,882,027 issued Apr. 18, 1989 to T. R. Kascak (therapeutic and arm exercise device); U.S. Pat. No. 5,738,613 issued Apr. 14, 1998 to T. Clayton (device and method for exercising the muscles of the fingers and hand using weights); U.S. Pat. No. 6,036,621 issued Mar. 14, 2000 to T. W. Hancock (digit gym for the exercise of hand and finger muscles); U.S. Pat. No. 6,179,750 B1 issued Jan. 30, 2001 to B. T. Lonergan (hand exercise system); U.S. Pat. No. 6,315,698 B1 issued Nov. 13, 2001 to G. Barber (guitar player's finger exerciser and method); U.S. Pat. No. 6,443,874 B1 issued Sep. 3, 2002 to M. Bennett (occupational therapy apparatus for strengthening fingers, hand, wrist, forearm and foot); and WO 90/07957 issued Jul. 26, 1990 to Peronelli and Rossa (weight-based exerciser for the fingers).

None of the above inventions and patents, taken either singly or in combination, is seen to describe the instant invention as claimed. Thus a digit therapy device solving the aforementioned problems is desired.

SUMMARY OF THE INVENTION

The present invention is directed to a digit therapy device and method for progressively desensitizing a patient's sensitive digit tip such as a sensitive tip of a finger, thumb, toe or big toe.

In one embodiment of the invention, the digit therapy device comprises a base, at least two attachment points each connected to or integral with the base, and at least one elongated flexible member, such as a string or wire, slung between the attachment points. This form of the invention is used to facilitate the desensitization of a sensitive digit tip by contacting a sensitive digit tip with the at least one elongated flexible member.

In another embodiment, the tautness of at least one elongated flexible member slung between at least two attachment points may be varied using a torsion adjuster. The torsion adjuster may be integrated into the design of one of the attachment points.

In yet another embodiment, a vibrator is operably connected to the flexible member, the vibrator being adapted to induce a vibration in the flexible member, thereby providing at least one artificially vibrated elongated flexible member to facilitate the desensitization of a sensitive digit tip by contacting the sensitive digit tip with the artificially vibrated elongated flexible member.

In a further embodiment, at least one elongated flexible member is attached to the base along its length, e.g. one or more wires or strings, may be glued to the base to create at least one ridge, equivalent to at least one raised strip, attached to the base, wherein the resulting ridge can provide a contact surface to facilitate desensitization of a sensitive digit tip by contacting the sensitive digit tip with the at least one ridge.

In another embodiment, the digit therapy device has a base having a surface, and at least one strip of material attached to the surface of the base, e.g. a strip of cloth and a further strip of rice paper glued to the base. The strips may be arranged in a logical pattern from smooth to rough, e.g. a first strip might comprise a strip of smooth felt, cloth, or wool (such as lambs wool), a second strip might comprise a textured rice strip or bean strip, a third strip might comprise a layer of emory cloth or, light sand paper, and a fourth strip might comprise of medium or heavy sand paper.

The strip may be split into a plurality (i.e., at least two) sections of varying smoothness or roughness, e.g. a first half of a strip may comprise of emory cloth and a second half of strip may comprise of sand paper. This form of the invention is used to facilitate the desensitization of a sensitive digit tip by contacting a sensitive digit tip with the at least one strip.

The digit therapy device may have a base, and a combination of at least one elongated flexible member and at least one ridge (including a raised strip), wherein the at least one ridge is adapted to facilitate the desensitization of a sensitive digit tip upon contacting the sensitive digit tip with any of the at least one elongated flexible member or at least one ridge.

In one embodiment of the invention, the method of desensitizing a sensitive digit tip comprises providing at least one flexible elongated member and/or ridge, and contacting the sensitive digit tip against the at least one flexible elongated member and/or ridge.

Accordingly, it is a principal object of the invention to provide a digit therapy device adapted to facilitate progressive desensitization of a sensitive digit tip such as a sensitive tip of a partially amputated finger, thumb, toe or big toe.

It is another object of the invention to provide a digit therapy device suitable for use in a non-clinical setting such as a patient's home.

It is still another object of the invention to provide a portable and a desk top version of a digit therapy device to desensitize a sensitive digit tip.

It is a further object of the invention to provide a method of desensitizing a sensitive digit tip such as a sensitive tip of a partially amputated or flayed finger, thumb, toe or big toe.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is directed a digit therapy device and method for progressively desensitizing a patient's sensitive digit tip such as a sensitive tip of a finger, thumb, toe or big toe. More particularly, the present invention is directed to a digit therapy device and method for ameliorating sensitivity (including hypersensitivity) over the tip of a digit such as a sensitive or hypersensitive tip of a finger, thumb, toe or big toe.

It should be understood that the term "digit" is intended herein to encompass any digit of the hand and feet including any finger or thumb of the right or left hand, and the toe and big toe of the right and left foot of a patient. It should be further understood that the term "sensitive digit tip" is intended herein to encompass a sensitive (including hypersensitive) tip of a patient's finger, thumb, toe or big toe. While the reason for a person (i.e. a patient) having a sensitive digit tip can vary, the apparatus and method disclosed herein is intended to assist in the desensitization of a sensitive digit tip in a patient requiring such treatment (e.g., the sensitive digit tip causes the patient pain if touched or knocked) regardless of the reason why the patient has a sensitive digit tip. Any theory disclosed herein should not be regarded as limiting the disclosed invention in any way.

Additionally, to assist in the description of the components of the digit therapy device, words such as left, right, up, down, front, upper, lower, rear, first, second, third and forth are used to describe the accompanying figures. It will be appreciated, however, that the digit therapy device of the invention can be located in a variety of different positions and orientations—including at various angles, sideways and even upside down. A detailed description of the digit therapy device of the invention now follows.

Figure 1:
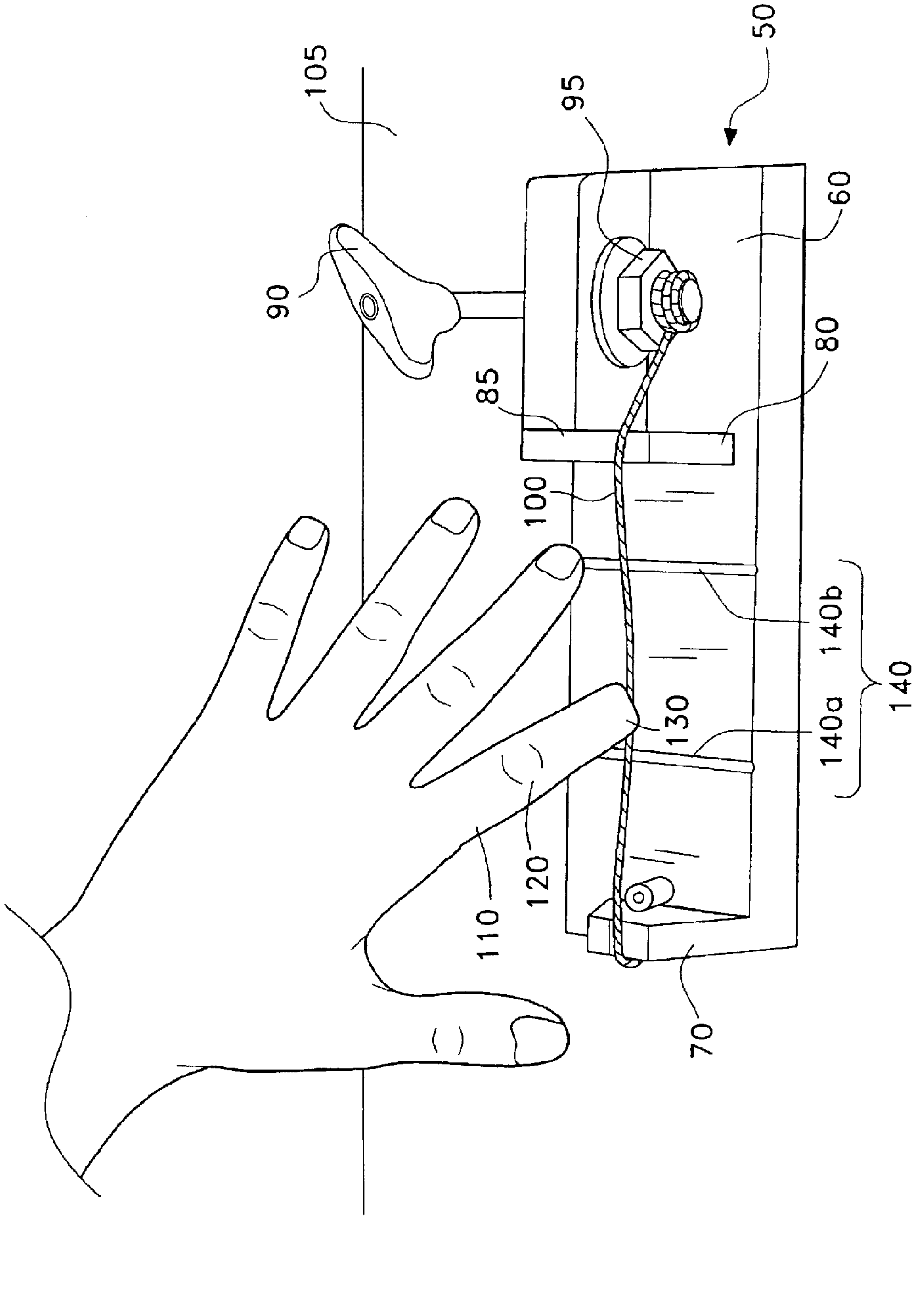
FIG. 1 is an environmental, perspective view of a digit therapy device according to the present invention.

FIG. 1 depicts an environmental perspective view of the digit therapy device 50, according to one embodiment of the invention.

The digit therapy device 50 is shown comprising a base 60, a first 70 and second 80 attachment points attached to the base. The second attachment point 80 may comprise a bridge member 85 and a torsion adjuster 90 with a peg 95. An elongated flexible member 100 with opposite ends is suspended between the first 70 and second 80 attachment points as shown. The bridge member 85 facilitates the attachment of one opposite end of the elongated flexible member 100 to the peg 95, as shown.

The bridge 85 is not essential and may be left out. For example, in FIG. 2, the digit therapy device 50 the torsion adjuster 90 is directly attached to one end of the elongated flexible member 100 without the aid of the bridge member 85. By turning the peg 95, the torsion adjuster 90 can vary the tautness of the elongated flexible member 100.

Still referring to FIG. 1 the digit therapy device 50 is shown being used to desensitize a digit 110 in the form of a partially amputated finger 120 comprising a sensitive digit tip 130. Specifically, the sensitive digit tip 130 is shown in contact with the elongated flexible member 100. The sensitive digit tip 130 is desensitized by regular contact with the elongated flexible member 100. The form of contact can vary; for example, the sensitive digit-tip 130 may stroke the elongated flexible member 100 either along the member 100 or across the member 100 in a direction perpendicular to the direction of the elongated flexible member 100. Such contacts between the sensitive digit tip 130 and the elongated flexible member 100 are less traumatic than the typical desensitization regime of tapping the sensitive digit tip 130 against a flat surface.

The base 60 maybe made of any suitable material including plastic, wood, steel (e.g., carbon steel, stainless steel), aluminum, brass, and copper. Suitable plastics include polyvinylchloride (PVC) and acrylonitrile-butadiene-styrene (ABS). The base 60 and attachment points 70 and 80 may be molded as one piece or in several pieces that can be snapped together. The base may include at least one elongated elevated part or at least one elongated crest or a linear series of crests in the form of at least one ridge 140*a* or array of ridges 140. The at least one ridge may be molded as an integral part of the base 60 or attached to the base 60 in the form of e.g. a raised strip 170 (see e.g. FIG. 4).

In one embodiment of the invention, the at least one elongated flexible member 100 is a flexible plait line made from a combination of two or more elongated flexible members twisted around each other. Each of the elongated flexible members comprises a material selected from the group consisting of: nylon, fishing line, steel, bronze, nickel, piano wire, rubber, or a combination thereof.

Figure 3:
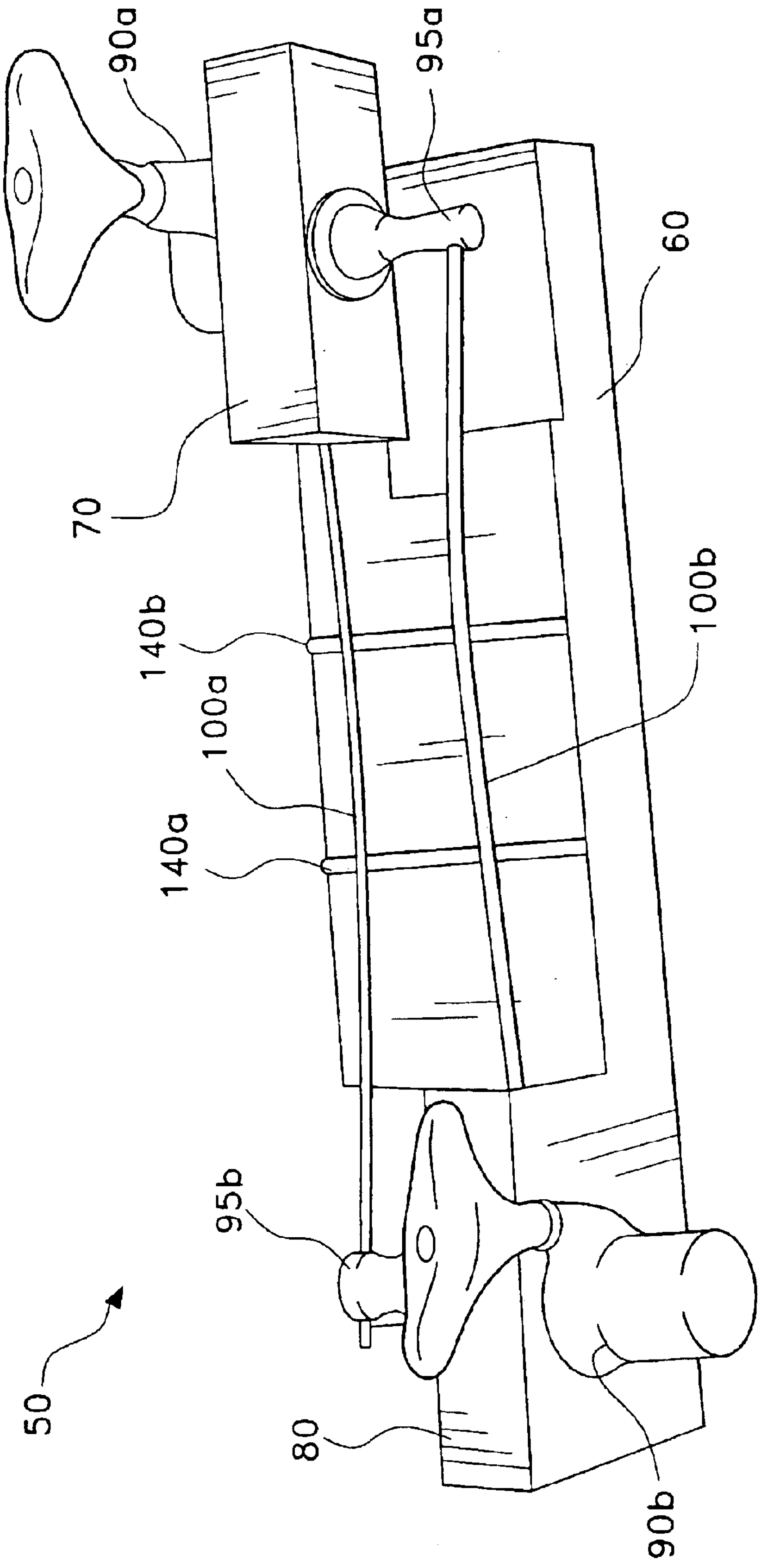
FIG. 3 is a perspective view of a digit therapy device according to the present invention with a plurality of elongated flexible members and torsion adjusters.

The digit therapy device 50 may include a plurality of elongated flexible members 100. For example, in FIG. 3, the digit therapy device 50 comprises a first 100*a* and a second 100*b* elongated flexible members, and torsion adjusters 90*a* and 90*b*, which incorporate pegs 95*a* and 95*b*, respectively. The torsion adjusters 90*a* and 90*b* are integrated into the attachment points 70 and 80, respectively. The attachments 70 and 80 are attached to base 60. One opposite end of the first elongated flexible members 100*a* is attached to the peg 95*b* of torsion adjuster 90*b* and the other opposite end is anchored to the attachment 70. Conversely, one opposite end of the second elongated flexible members 100*b* is attached to the peg 95*a* and the other opposite end is anchored to the attachment 80. The first 100*a* and a second 100*b* elongated flexible members may be separately set to a different tautness using the pegs 95*b* and 95*a*, respectively. Thus, the digit therapy device 50 is adapted to facilitate the progressive desensitization of a sensitive digit tip 130.

In one embodiment, at least one elongated flexible member 100 comprises a layer of soft fabric 155 (see, e.g., FIG. 7) thereby providing a textured surface for contacting with a sensitive digit tip 130 to facilitate the progressive desensitization of a sensitive digit tip 130 such as the tip of a partially amputated finger.

In one embodiment of the invention, a method is provided for alleviating the symptoms of a sensitive digit tip 130 of a patient, comprising the steps of providing at least one elongated flexible member 100, and contacting the sensitive digit tip 130 against the at least one elongated flexible member 100. The form of contacting can vary; for example, a sensitive digit tip 130 can gently tap, stroke, or press against an elongated flexible member 100. Since the member 100 is flexible and will naturally yield even if tapped by a sensitive digit tip 130, contact between the digit tip 130 and the member 100 will produce less pain in a patient requiring such desensitization treatment than the same patient relying on the traditional desensitization technique of tapping the digit tip 130 against a flat unyielding surface.

The tautness of the at least one elongated flexible member 110 can be varied according to the needs or wishes of a patient with a sensitive digit tip 130. For example, if the patient finds that the at least one elongated flexible member 100 is too taut or causes discomfort, the patient may, for example, decrease the tautness of the elongated flexible member 100 using the torsion adjuster 90.

Still referring to FIG. 1, the base 60 optionally comprises an at least one ridge 140*a*. Alternatively, the at least one ridge 140*a* may take the form of at least one strip 170 (e.g., see FIG. 4) attached to the base 60, e.g. a strip of a soft cloth and a strip of rough cloth. The at least one ridge 140 may have any suitable surface such as a molded textured surface. Alternatively, the at least one ridge 140*a* may comprise a layer of material such as a layer of fabric, felt, rice paper, emory cloth, light sand paper, medium sandpaper, or heavy sand paper, arranged in any suitable fashion to facilitate the progressive desensitization of a sensitive digit tip 130 by contacting the sensitive digit tip 130 against the at least one ridge 140*a*.

In one embodiment, the plurality or array of ridges 140 comprises a first ridge 140*a* and a second ridge 140*b*. The first ridge 140*a* may comprise a smooth coating such as a coat of polytetrafluoroethylene (PTFE), and ridge surface 145*b* may comprise of a less smooth surface such as rice paper. By contacting a sensitive digit tip 130 with the first 140*a* and second 140*b* ridge the sensitive digit tip 130 maybe progressively desensitized in a far less traumatic or painful manner compared to the typical desensitization regime of e.g. tapping the entire tip 130 against a solid surface. It is believed that the each of the ridges 140, comprising e.g. a layer of fabric cloth, provides nerve stimuli sufficient to aid progressive desensitization of a sensitive digit, tip 130.

Figure 4:
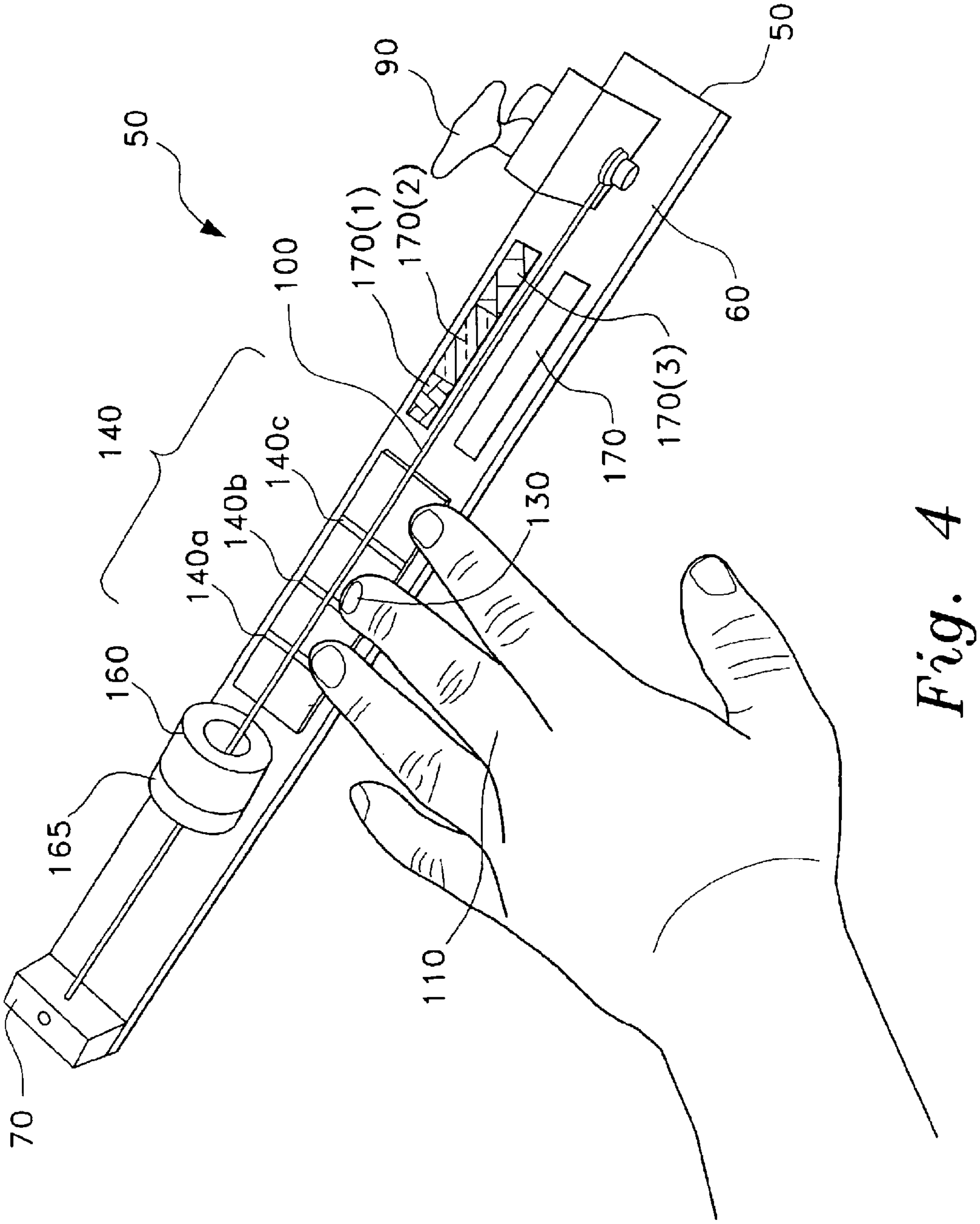
FIG. 4 is a perspective view of a digit therapy device according to the present invention with a vibrator attached to at least one elongated flexible member.

FIG. 4 shows another example of the digit therapy device 50, according to the present invention. A vibrator 160 is operably connected to the at least one elongated flexible member 100, wherein the vibrator 160 is adapted to induce a vibration in at least one elongated flexible member 100 thereby providing at least one artificially vibrated elongated flexible member 100 to facilitate the desensitization of a sensitive digit tip 130 by contacting the sensitive digit tip 130 with the at least one artificially vibrated elongated flexible member 100. The form of contact can vary; for example, the sensitive digit tip 130 can be moved closer to the vibrated member 100 until the member 100 is rhythmically vibrating against the sensitive digit tip 130. It is preferred that the output from the vibrator 160 is controllable to allow the patient to quickly find a soothing frequency of vibrations to apply to the sensitive digit tip 130.

String and wire vibrators are well know and even taught in high school science classes. For example, part number "DC #15240" supplied by The Science Source educational supply service (The Science Source, Atlantic Highway (Route One), Waldoboro, Me., 04572), is a versatile string vibrator used by High Schools to vibrate multiple strings or wires attached to the vibrator. Wire vibrators, based on e.g. solenoids, are also well known and need not be discussed further here.

A battery 165 (FIG. 4) may be used to power the vibrator 160. The battery 165 may form part of the base 60. The battery 165 may be a rechargeable battery or a non-rechargeable battery of the type found on general sale in e.g. supermarkets and hardware stores. Alternatively, the vibrator 160 may be adapted to accept alternating current (AC) such as a mains power supply, e.g. a 110 V AC power supply, wherein the vibrator 160 further comprises a power lead extending from the vibrator 160 and comprising an end adapted to connect with the AC power supply.

Still referring to FIG. 4, the digit therapy device comprises at least one strip of material 170 of predetermined roughness or smoothness. The at least one strip of material 170 may comprise of plastic (e.g., PTFE), rubber, velcro, leather, cotton, wood, burlap, wool, sandpaper, Scotch-brite™ (supplied by 3M), vinyl, simulated rice strip, and simulated bean strip. The at least one strip 170 may comprise a plurality of sections of different material of different smoothness comprising of e.g. PTFE 170(1), smooth cloth 170(2), and sandpaper 170(3).

Figure 5:
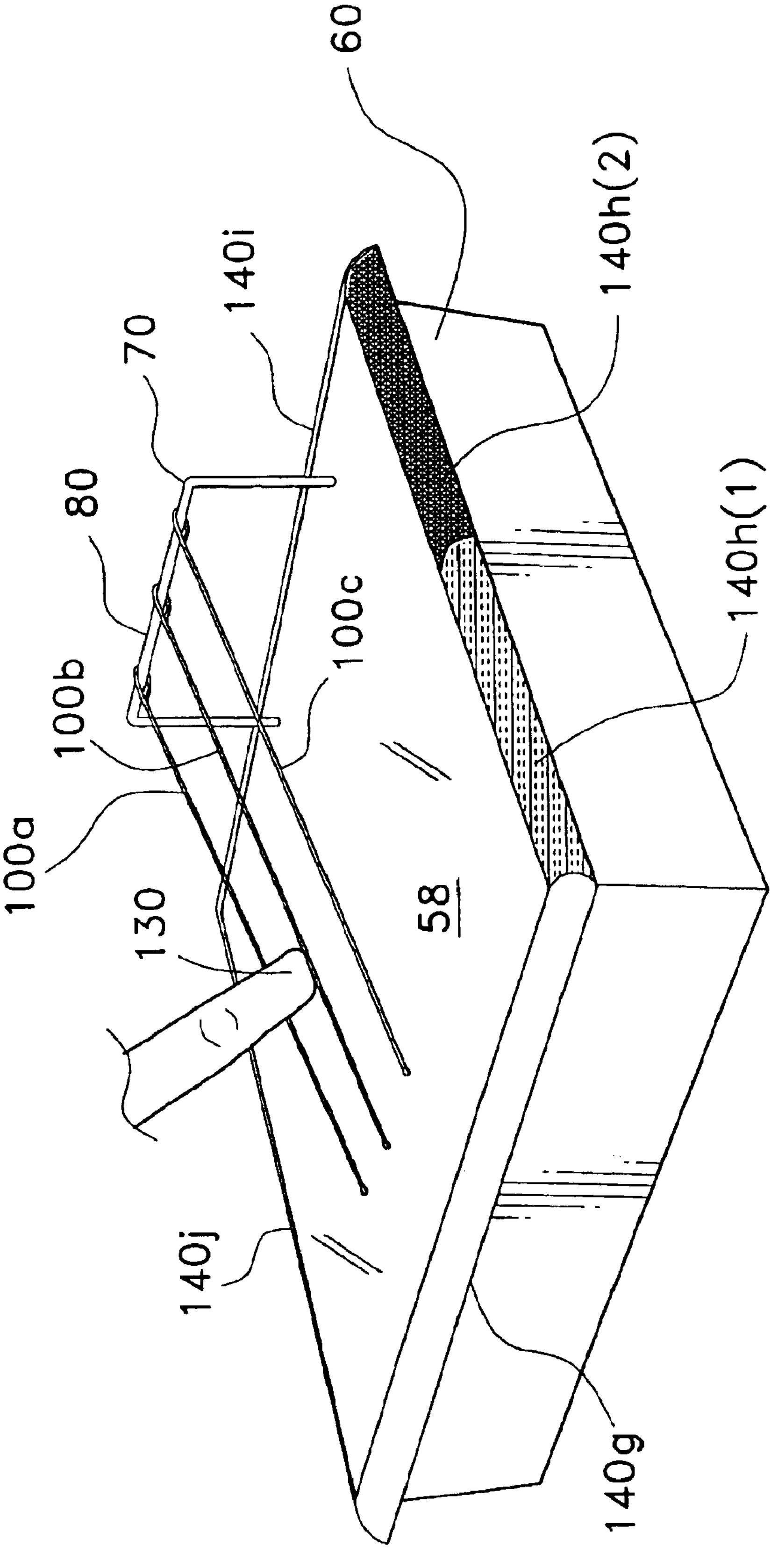
FIG. 5 is a perspective view of a digit therapy device according to the present invention having at least one elongated flexible member with one end attached directly to a base.

FIG. 5 shows a digit tip 130 of a partially amputated finger being desensitized by running the digit tip 130 across one of the elongated flexible members 100*a*, 100*b* and 100*c*. Each of the elongated flexible members 100*a*, 100*b* and 100*c* has opposite ends, with one of the opposite ends being attached directly to an upper surface 58 of the base 60 and the other opposite end being connected to the raised attachment point 70. The tautness of the elongated flexible members 100*a*, 100*b* and 100*c* can be preset at the manufacturing stage by stretching each member prior to attaching the ends to the base 60 and attachment point 70, respectively. In this configuration, each of the elongated flexible members 100*a*, 100*b* and 100*c* forms an angle of between about 5 degrees and about 85 degrees with respect to the upper surface 58 of the base 60. The base 60 optionally comprises at least one ridge 140 (shown in this configuration of the digit therapy device as 140*g*, 140*h*, 140*i*, and 140*j*) of varying roughness or smoothness for contacting with a sensitive digit tip to facilitate desensitization of the sensitive digit tip 130.

Still referring to FIG. 5, the at least one ridge 140 may comprise two sections to provide a combination of, for example, a layer of emory cloth along a first section 140*h*(1) and a layer of medium sand paper along a second section 140*h*(2), wherein the two sections 140*h*(1) and 140*h*(2) obviously have different smoothness; and conversely, roughness.

In one embodiment of the invention, a method is provided for desensitizing a sensitive digit tip 130 using the digit therapy device 50. A patient with a sensitive digit tip 130 contacts, e.g. by stroking, a first ridge 140 with a coating of PTFE and, once able, moves onto stroking the sensitive digit tip 130 on a second ridge 140*b* comprising of a textured layer of fabric cloth, then onto the third ridge 140*c* comprising velcro surface and so on. Thus, a patient may progressively desensitize their digit tip 130 by rubbing their digit tip 130 in turn on increasingly less smooth ridges 140.

It should be understood that the exact arrangement and location of the at least one ridge 140 can vary. For example, the at least one ridge 140 may be located on one or more sides of the base 60 of the digit therapy device 50.

In one method of progressively desensitizing a sensitive digit tip 130, the sensitive digit tip 130 is contacted in turn on at least one ridge 140 or on at least one elongated flexible member 100, or strip 170, or any combination thereof. Alternatively, the digit therapy device 50 may be moved, e.g. back and for, relative to the sensitive digit tip 130 thus mimicking rubbing or moving the sensitive digit tip 130 against any of the at least one elongated flexible member 100, ridge 140, or strip 170.

Figure 6:
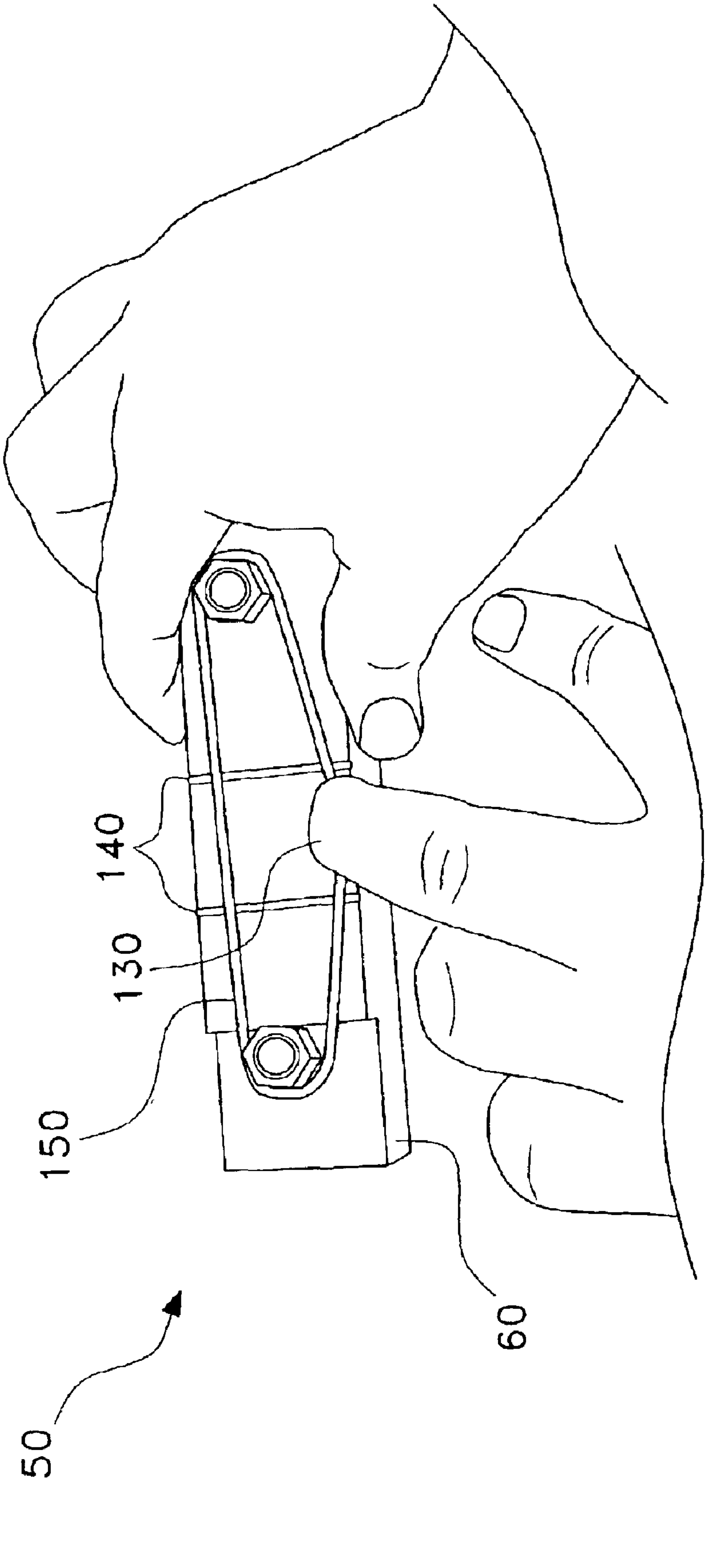
FIG. 6 is a perspective view of a digit therapy device according to the present invention showing at least one O-ring suspended between two attachment points.

FIG. 6 shows a further example of the digit therapy device comprising an elongated flexible member 100 in the form of at least one O-ring 150. A patient is progressively desensitizing a sensitive digit tip 130 by caressing the tip 130 against the O-ring 150. The O-ring 150 may be made out of any suitable material, e.g. rubber.

Figure 7:
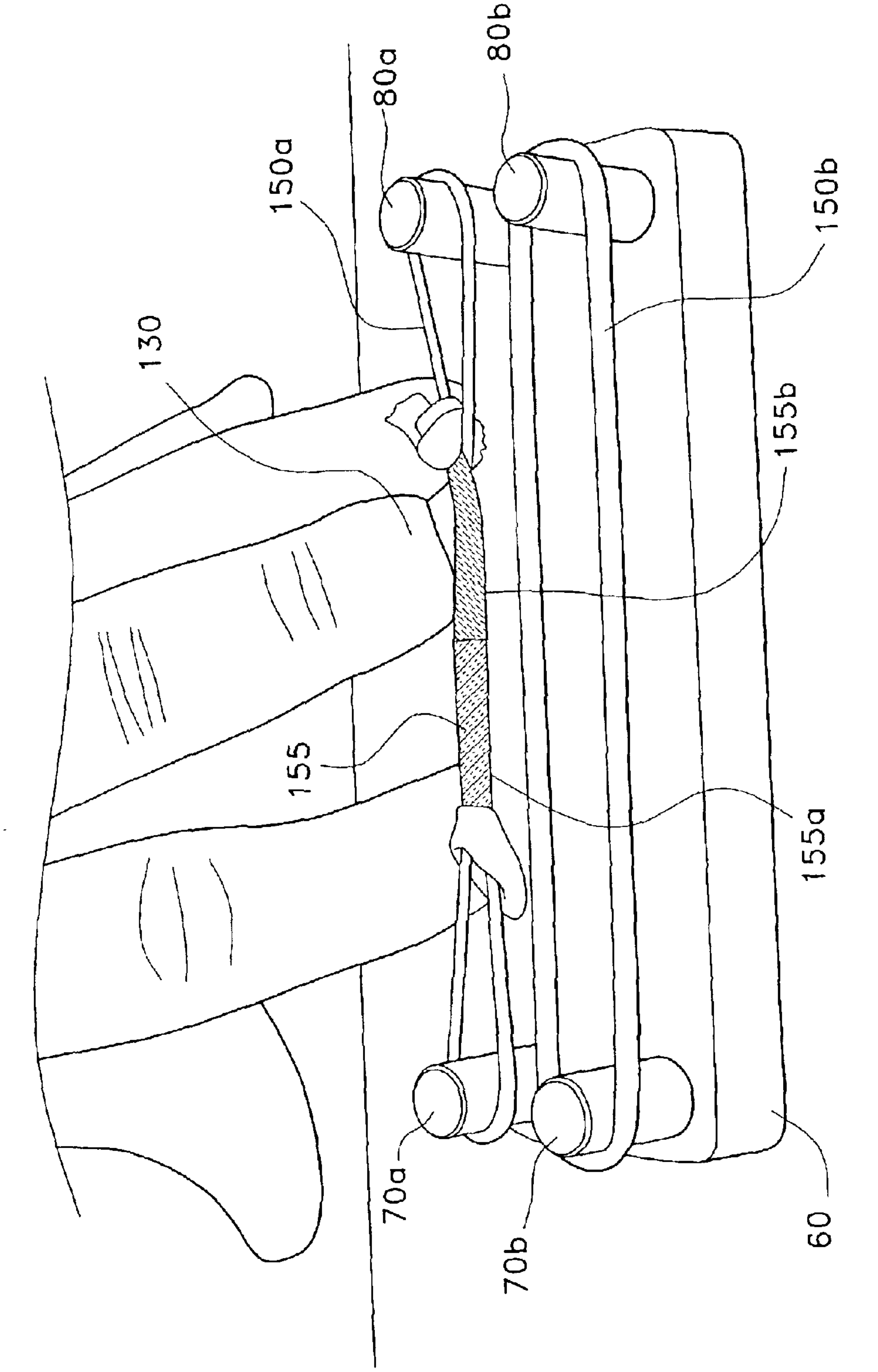
FIG. 7 is a perspective view of a digit therapy device according to the present invention having a plurality of O-rings.

FIG. 7 shows a further example of the digit therapy device comprising O-rings 150*a* and 150*b* slung between the attachment points 70*a* and 80*a*, and 70*b* and 80*b*, respectively. A patient can progressively desensitize a sensitive digit tip 130 by caressing the tip 130 against either O-ring 150*a* or 150*b*. The at least one O-ring 150 may comprise of O-rings of different texture and flexibility with varying vibration characteristics.

One or more O-rings 150 may comprise a section of O-ring covered in a layer of material 155 as shown in FIG. 7, such as cotton. A section of the O-ring 150*a* is shown covered in a layer of material 155 comprising cotton 155. The layer of material 155 may further comprise different sections of material, e.g., a section of cotton 155*a* and a section of velcro 155*b*.

By vibrating the O-ring 150 and contacting a sensitive digit tip 130 against either the section of material 155 or O-ring serves to provide additional stimuli for a sensitive digit tip 130 thereby providing a further way of desensitization of the digit tip 130. It should be understood that the step of contacting can take other forms such as rolling the sensitive digit tip 130 off an elongated flexible member 100, a ridge 140, a strip 170, or combination thereof.

Figure 8:
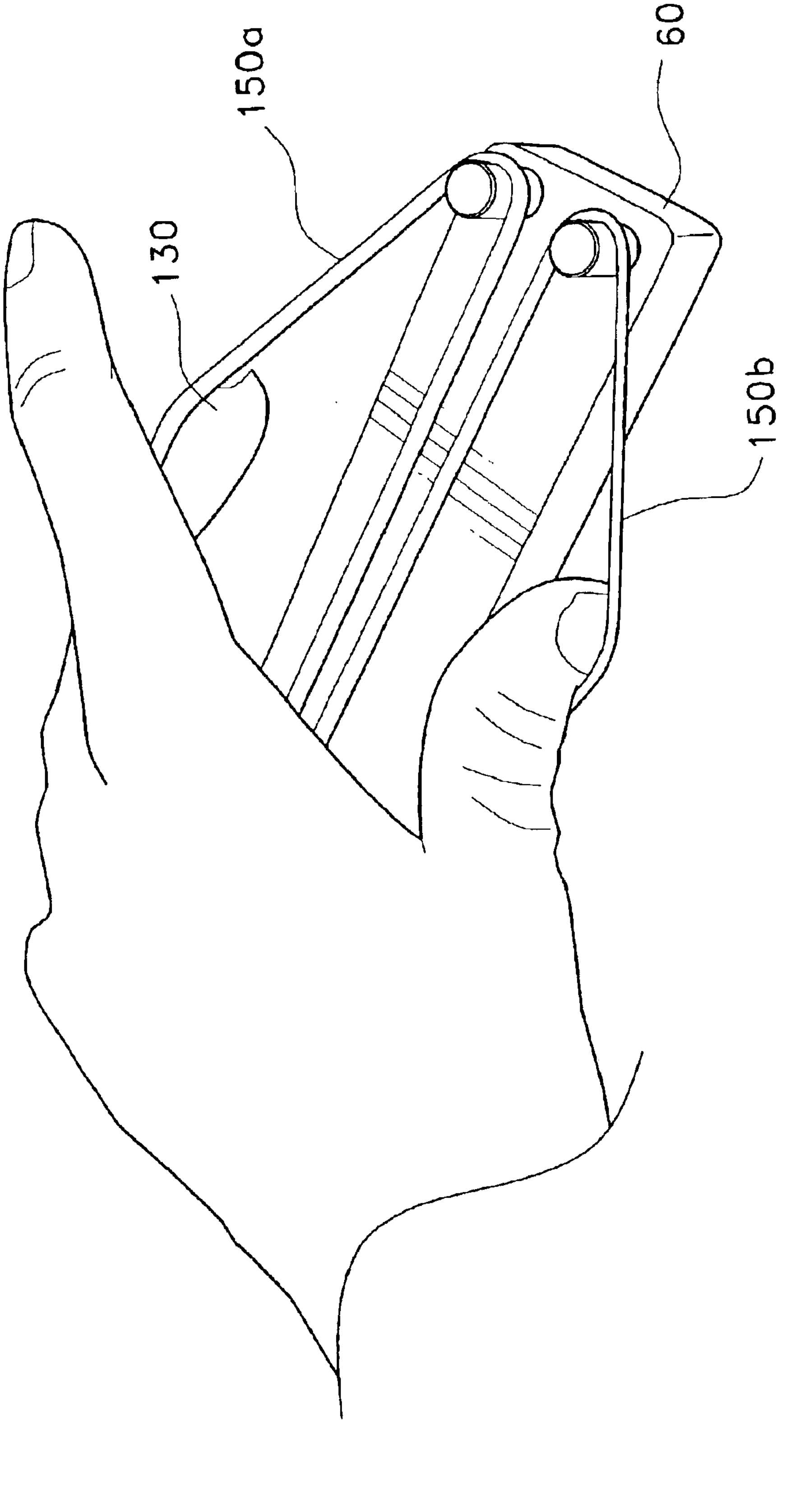
FIG. 8 is a perspective view of a digit therapy device adapted for exercising a plurality of digits comprising a sensitive digit tip.

In another embodiment, the O-rings 150 may be used for progressive stress work to hasten desensitization of the sensitive digit tip 130 as shown in FIG. 8.

Figure 9:
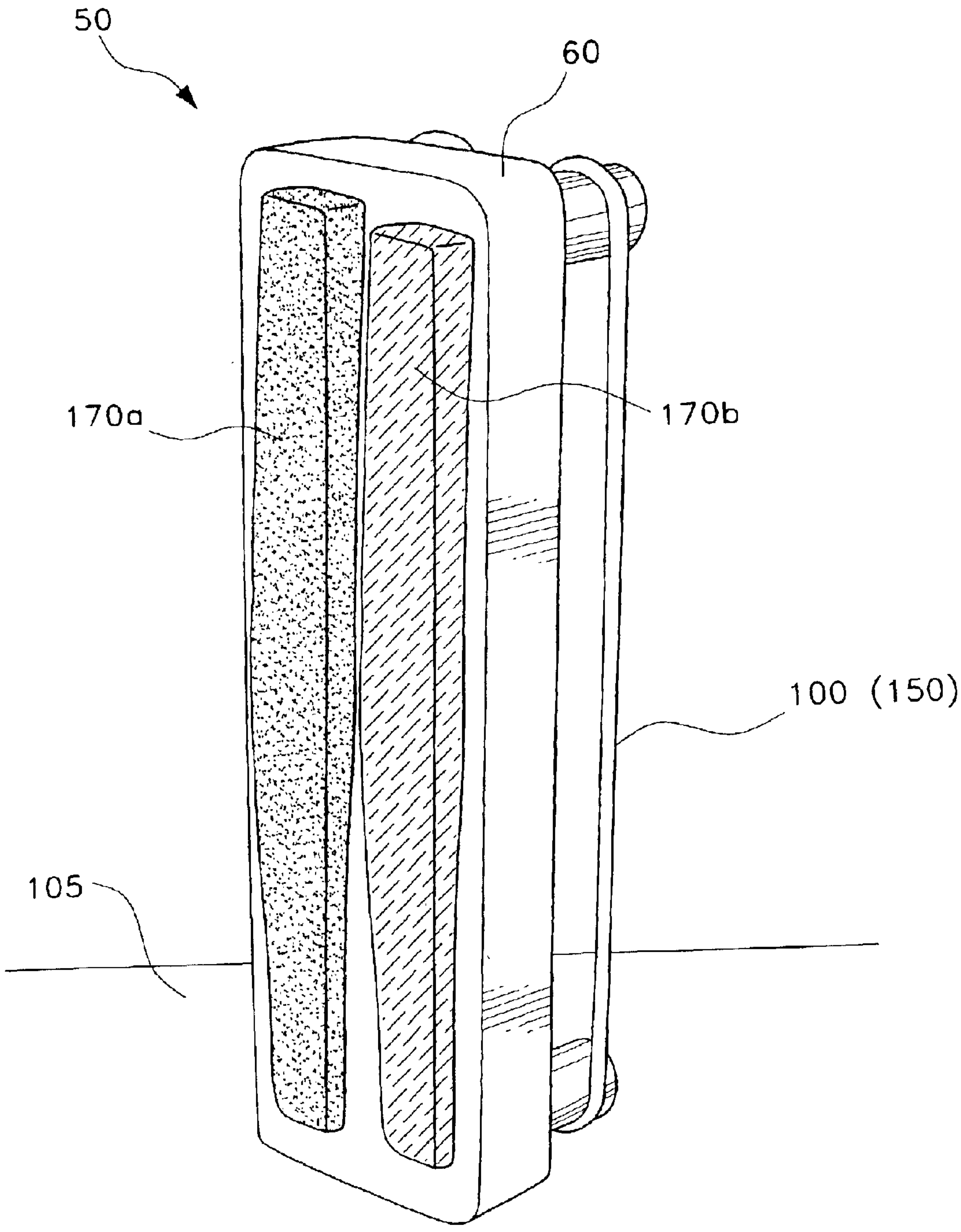
FIG. 9 is a perspective view of a digit therapy device adapted for vertical use.

FIG. 9 shows a vertical version of the digit therapy device 50. This version of the digit therapy device 50 can also be used in a horizontal mode and upside down (not shown).

Figure 10:
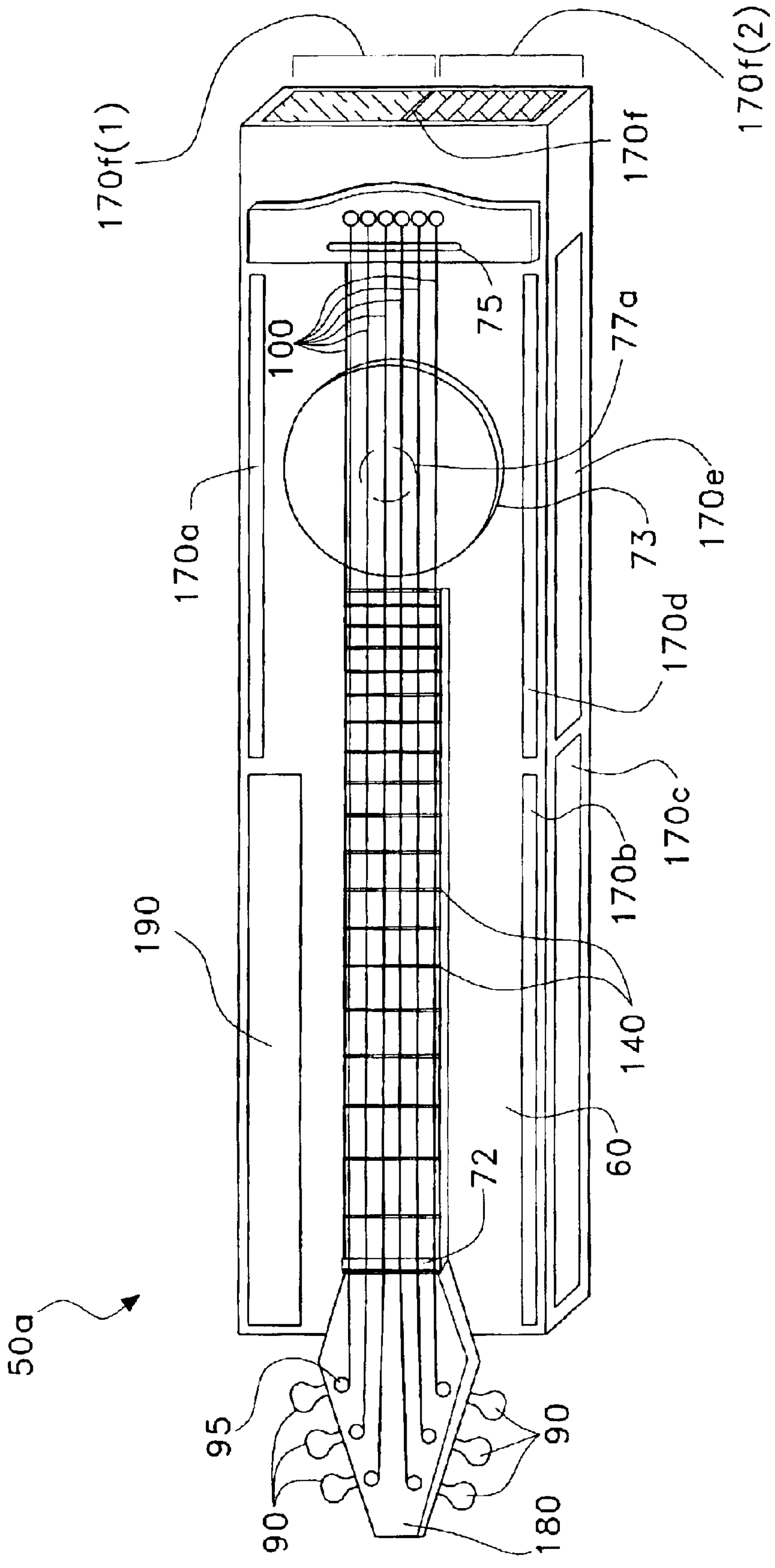
FIG. 10 is a perspective view of a digit therapy device, according to the present invention, having at least one hand and arm support together with a plurality of elongated flexible members in combination with a plurality of ridges in a configuration adapted to desensitize a sensitive digit tip.

In addition, the digit therapy device 50 can adopt a variety of appearances. For example, a deluxe table top model 50*a* of the digit therapy device 50 is shown in FIG. 10. The deluxe model 50*a* comprises a plurality of elongated flexible members 100 attached to complementary set of torsion adjusters 90. The torsion adjusters 90 are attached to a head stock 180, which is attached to the base 60. A nut headpiece 72 keeps the plurality of elongated flexible members 100 in place above the base 60. A height adjustable pad 73 is located on the base 60 and beneath the plurality of elongated flexible members 100; the pad 73 includes a threaded base member (not shown) attached to the base 60. A hand rest 190 is fitted to the base 60. Strips 170 and ridges 140 with different smooth and rough surfaces are located at various points on the base 60. The ridges 140 may take the form of fret ridges or wire in close proximity to or attached to the base 60. Thus, it should be understood that the digit therapy device 50 can come in various shapes, sizes, and incorporate different additional features.

While the digit therapy device 50 can be used on a table surface 105, the device 50 can also be used in a variety of ways. For example, the digit therapy device 50 could be dimensioned to sit on the palm of one hand and a sensitive digit tip 130 of another hand rubbed against the elongated flexible member 100 to facilitate desensitization of the sensitive digit tip 130. In addition, the digit therapy device 50 can be used in various orientations including horizontal (as shown in e.g. FIG. 1) and vertical as shown in e.g. FIG. 9.

The elongated flexible member 100 and ridge 140 is preferably narrower than the width of a sensitive digit tip 130. The diameter and/or thickness of the member 100 is preferably between about 0.1 inches and about 0.3 inches.

The base 60 can be any suitable length, but preferably between about 3 inches and about 20 inches; more preferably between about 6 inches and 12 inches; still more preferably between about 6 inches to about 10 inches in length. The base 60 is preferably between about 1 inch and 15 inches in width, and more preferably between about 1 inch and 10 inches, and still more preferably between about 1 inch and 5 inches in width.

The length of the at least one elongated flexible member 100, ridge 140, and strip 170 should be sufficient to accommodate contact with a sensitive digit tip 130. It is preferred that the members 100, 140, and 170 are between about 1 inch and about 18 inches, and more preferably between about two in inches and ten inches, and still more preferably between about 2 inches and five inches in length.

Figure 2:
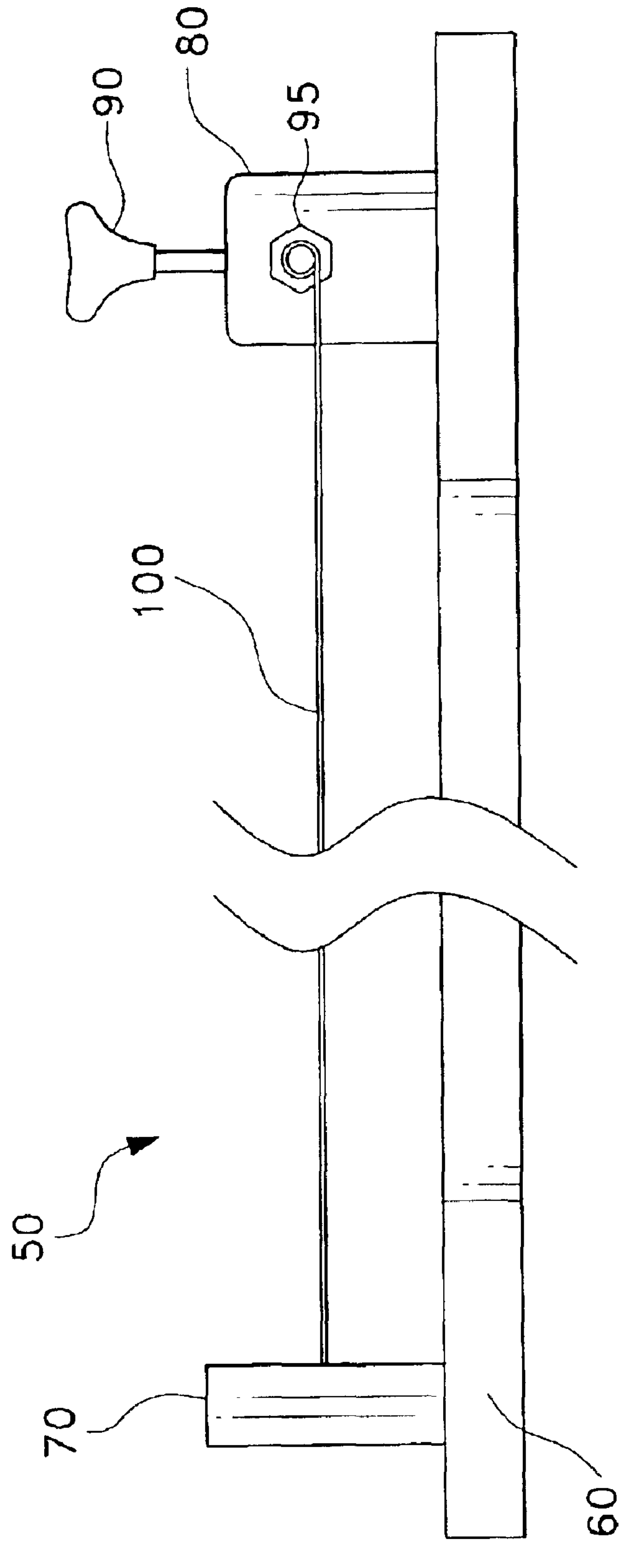
FIG. 2 is a perspective view of a digit therapy device according to the present invention with a torsion adjuster.

With respect to the at least one elongated flexible member 100, if a torsion adjuster 90 is present, then the at least one elongated flexible member 100 should be of sufficient length to allow one end of the member 100 to be wrapped around the peg 95 and be suspended between the torsion adjuster 90 and an attachment point such as attachment point 70 (e.g. see FIG. 2). For tonal purposes, a length of about seven inches is preferred in the at least one elongated flexible member 100.

The digit therapy device 50 may have dimensions that allow the device to be eminently portable and easily gripped by a healthy hand while a digit tip 130 of the injured hand is stroked across or along e.g. a ridge 140 comprising a surface of fabric cloth. Thus, the digit therapy device 50 may be used by a patient in just about any setting, such as an office, at home, or while traveling on a train or as a desk top model in e.g. a hand therapy clinic.

In an embodiment of the invention, a method is provided for alleviating sensitivity (including hypersensitivity) across a sensitive digit tip such as the tip of an amputated finger 120, comprising the steps of providing at least one elongated flexible member 100, and running or stroking the sensitive digit tip 130 across the at least one elongated flexible member 100. Alternatively, a vibration is imparted on an elongated flexible member 100 and then the sensitive digit tip 130 is placed in contact with the vibrated elongated flexible member 100.

In another embodiment of the invention, a method is provided for alleviating sensitivity (including hypersensitivity) across a sensitive digit tip such as the tip of an amputated finger 120, comprising the steps of providing at least one ridge member 140, and running or stroking the sensitive digit tip 130 across the at least one ridge member 140.

In yet another embodiment of the invention, a method is provided for alleviating sensitivity (including hypersensitivity) across a sensitive digit tip such as the tip of an amputated finger 120, comprising the steps of providing at least one strip 170 member attached to the base 60, and running or stroking the sensitive digit tip 130 across the at least one strip member 170.

In a further embodiment of the invention, a method of progressively desensitizing a sensitive digit tip 130 comprises providing a plurality of ridge members 140 and contacting the sensitive digit tip in turn with each of the plurality of ridge members 140. Varying the roughness or smoothness of each ridge 140 further facilitates the progressive desensitization of the sensitive digit tip 130. For example, a desensitization regime comprises repeatedly running the sensitive digit tip 130 across a ridge 140*a* coated in Teflon™ and later against a ridge 140*b* with a surface comprising a emory cloth, and still later against a ridge 140*c* covered in rough sandpaper.

A table top version (see e.g. FIG. 10) of the digit therapy device 50 could be considerably larger than the portable variant. The table top model could have friction pads 200 on a lower surface 62 of the base 60 to prevent slipping of the device 50 when a sensitive digit tip is rubbed against or across an elongated flexible member 100, ridge surface 140, or strip 170. Also, the table top variant preferably has a base 60 considerably longer and wider than the portable variant and may encompass a greater array of e.g. ridges 140.

In the context of the present invention, the term "smoothness" is best defined by using descriptive examples. For example, in an array of strips 170 (e.g. see FIG. 10) of different smoothness comprising a first strip 170*a* of polytetrafluoroethylene (PTFE), a second strip 170*b* of cotton, a third strip 170*c* of emory cloth, and a fourth strip 170*d* of sand paper; in this example, the first strip 170*a* is regarded as smooth, the second strip 170*b* as less smooth than the first strip 170*a*, the third strip 170*c* as less smooth than the second strip 170*b*, and the forth strip 170*d* as less smooth than the third strip 170*c*.

In a second example (FIG. 10), at least one strip 170 is split up into different sections of varying smoothness, comprising a first section 170*f*(1) of PTFE, a second section 170*f*(2) of rice paper, and a third section 170*f*(3) of emory cloth; in this example, the first section 170*f*(1) is regarded as smooth, the second section 170*f*(2) as less smooth than the first section 170*f*(1), and the third section 170*f*(3) as less smooth than the second section 170*f*(2).

It should be understood that the term "roughness" is regarded herein as the converse (i.e. reverse) of "smoothness". For example, in an array of strips 170 of different roughness comprising a first strip of PTFE 170*a*, a second strip of cotton 170*b*, a third strip of emory cloth 170*c*, and a fourth strip of sand paper 170*d;* in this example, the first strip is regarded as the least rough, the second strip 170*b* as more rough than the first strip 170*a*, the third strip 170*c* as more rough than the second strip 170*b*, and the forth strip 170*d* as more rough than the third strip 170*c*. Thus, in this example, the order of roughness, from least rough to most rough, is: 170*a*, 170*b*, 170*c*, and 170*d;* and therefore, the order of smoothness from least smooth to most smooth is: 170*d*, 170*c*, 170*b*, and 170*a* (i.e. in the reverse order).

It should be understood that various components in the digit therapy device 50 may be integrated. For example, the strip 170 may be integrated with the base 60 such that the strip 170 resembles a ridge 140; and the torsion adjuster 90 may be integrated into an attachment point (e.g., attachment point 80 as shown in FIG. 2).

It is to be understood that the present invention is not limited to the embodiments described above, but encompasses any and all embodiments within the scope of the following claims.

I claim:

1. A digit therapy device adapted to facilitate progressive desensitization of a sensitive digit tip, comprising:

a base;

first and second attachment points attached to the base;

at least one elongated flexible member suspended between the first and second attachment points to provide a digit therapy device to facilitate progressive desensitization of a sensitive digit tip; and at least one ridge adapted to facilitate the desensitization of the sensitive digit tip, wherein the at least one ridge is split into a plurality of sections of different smoothness and conversely of different roughness.

2. The digit therapy device of claim 1, further comprising a vibrator, wherein the vibrator is operably connected to the at least one elongated flexible member, and wherein the vibrator is adapted to induce a vibration in the at least one elongated flexible member.

3. The digit therapy device of claim 1, wherein the base has an upper surface, wherein the first attachment point extends upwards from the base and the second attachment point forms part of the base such that the at least one elongated flexible member forms an angle of between about 5 degrees and 85 degrees with respect to the upper surface of the base.

4. The digit therapy device of claim 1, wherein the at least one elongated flexible member comprises a material selected from the group consisting of: nylon, fishing line, steel, bronze, nickel, piano wire, rubber, or a combination thereof.

5. The digit therapy device of claim 1, wherein the at least one elongated flexible member comprises a coating of plastic.

6. The digit therapy device of claim 1, wherein the at least one elongated flexible member is a flexible plait line made from a combination of two or more elongated flexible members twisted around each other to provide the flexible plait line.

7. The digit therapy device of claim 6, wherein the plait line comprises a first line and a second line each comprising a material selected from the group consisting of: nylon, steel, nickel, bronze, and copper to provide the plait line, wherein the plait line has a varied texture along its length to facilitate progressive desensitization of the sensitive digit tip.

8. The digit therapy device of claim 1, further comprising a torsion adjuster operably connected to the at least one elongated flexible member, wherein the torsion adjuster is adapted to vary the tautness of the at least one elongated flexible member.

9. A digit therapy device adapted to facilitate progressive desensitization of a sensitive digit tip, comprising:

a base;

first and second attachment points attached to the base;

at least one elongated flexible member suspended between the first and second attachment points to provide a digit therapy device to facilitate progressive desensitization of a sensitive digit tip; and at least one strip adapted to facilitate the desensitization of the sensitive digit tip, wherein the at least one strip is split into a plurality of sections of different smoothness and conversely of different roughness.

10. The digit therapy device of claim 9, wherein the at least one strip of material is selected from the group consisting of: plastic, rubber, VELCRO, leather, cotton, wood, burlap, wool, sandpaper, simulated rice paper, wire, string, and simulated bean strip.

11. The digit therapy device of claim 9, wherein at least one of the at least one strip is glued to the base.

12. A method for progressively desensitizing a tip of a digit in a patient requiring such desensitization, comprising the steps of:

providing at least one elongated flexible member adapted to progressively desensitizing a sensitive digit tip;

providing a vibrator operably connected to the at least one elongated flexible member, wherein the vibrator is adapted to induce a vibration in the at least one elongated flexible member and contacting the sensitive digit tip with said at least one elongated flexible member.

* * * * *